Sept. 12, 1967 P. L. TJOSSEM 3,341,171
CONTROL VALVE
Filed Nov. 16, 1964
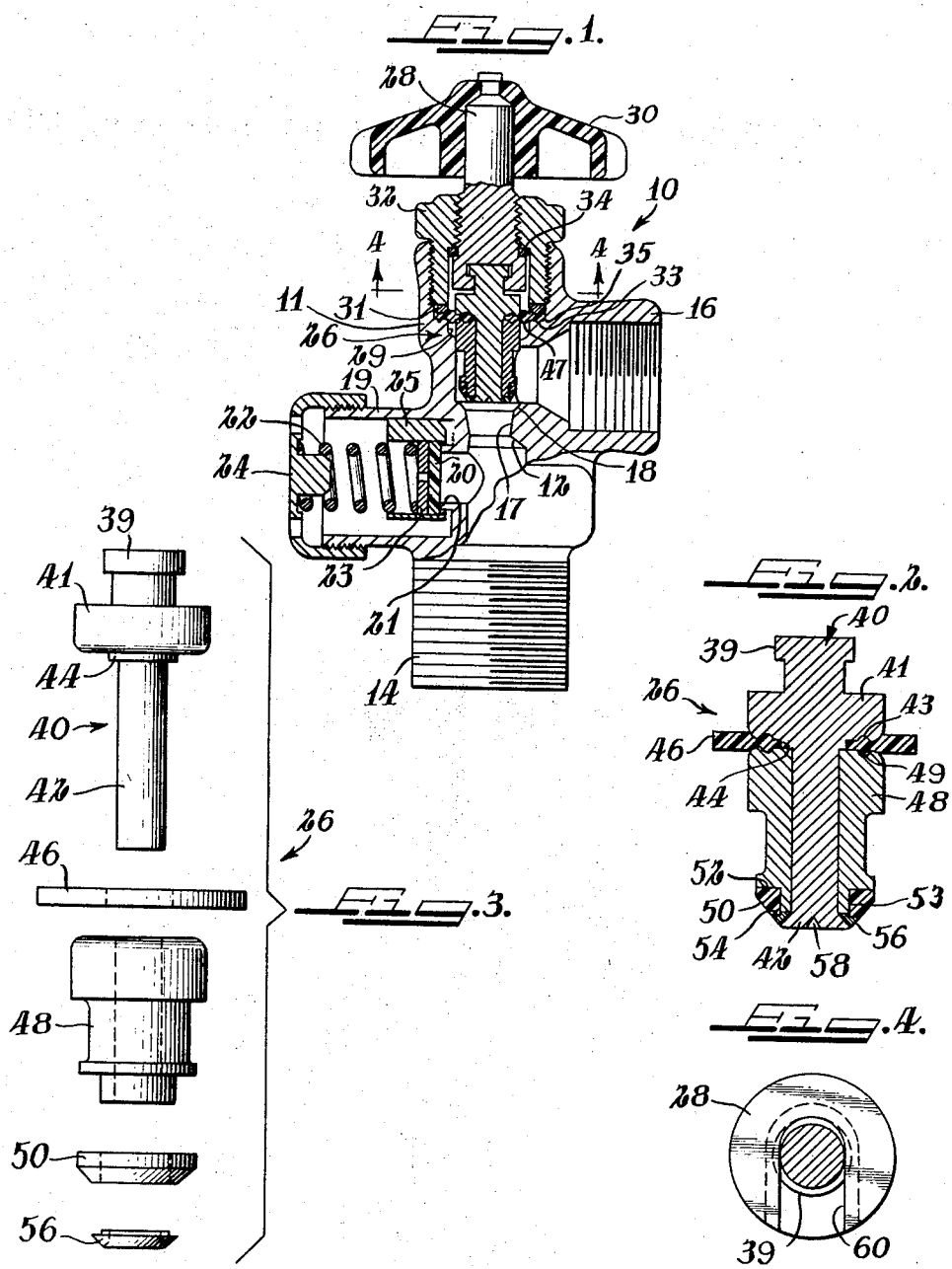
INVENTOR.
PAUL L. TJOSSEM
BY Bair, Freeman &
Molinare Attys.

United States Patent Office 3,341,171
Patented Sept. 12, 1967

3,341,171
CONTROL VALVE
Paul L. Tjossem, Marshalltown, Iowa, assignor to Fisher Governor Company, a corporation of Iowa
Filed Nov. 16, 1964, Ser. No. 411,349
2 Claims. (Cl. 251—335)

This invention relates to a control valve and, more particularly, to an improved sealing and valve assembly for use in such valve.

Control valves commonly comprise a valve housing or valve body having a fluid flow passage defined therethrough. Defined about the flow passage within the valve body is a valve seat. Provided in an opening in the valve body extending from the exterior thereof and communicating with the flow passage is a valve closure assembly. The valve closure assembly ordinarily comprises a valve disc or valve element carried on the valve closure assembly and a separate seal member provided about the valve closure assembly for sealing between the opening and the valve closure assembly.

Such prior constructions are not entirely satisfactory for they require relatively complex assembly and the seal member provided between the opening in the valve body and the valve closure assembly is subject to damage during assembly. Due to rotation of the valve closure assembly to seat the valve disc against the valve seat, the valve disc may be scored or cut, thereby reducing the sealing life thereof. Since the seal member is a separate entity from the valve closure means, the sealing member will often be damaged or scored during assembly, thereby resulting in leakage between the valve closure assembly and the valve body in use.

An object of the present invention is to provide an improved control valve having a unique disc holder and sealing diaphragm subassembly which is easily assembled and which will positively prevent leakage between the opening in the valve body and the exterior of the disc holder and sealing diaphragm subassembly.

Another object of the present invention is to provide an improved control valve having a novel disc holder and sealing diaphragm subassembly, such disc holder and sealing diaphragm subassembly comprising an annular diaphragm retained along its inner periphery between a disc holder and a sleeve which are affixed to one another and which diaphragm is retained along its outer periphery between the valve body and its bonnet.

A further object of this invention is to provide an improved control valve having a valve closure assembly supporting a valve disc thereon and being movable reciprocally to and from a valve seat in said control valve in response to rotation of a handwheel and valve stem. Other objects and advantages of this invention will become more apparent hereinafter.

The specific structural details and their mode of functioning will be made most manifest and particularly poined out in clear, concise and exact terms in conjunction with the accompanying drawing, wherein:

FIGURE 1 is a cross-sectional view of a valve embodying the present invention;

FIGURE 2 is an enlarged cross-sectional view of the disc holder and diaphragm assembly of the present invention;

FIGURE 3 is an exploded view of the disc holder and diaphragm subassembly; and

FIGURE 4 is a detail view of the interconnection between the valve stem and the disc holder and diaphragm subassembly taken generally along the line 4—4 of FIGURE 1.

Referring now to FIGURE 1, there is shown a control valve or cylinder valve embodying the present invention. The cylinder valve 10 comprises a housing or valve body 11 having a passageway 12 therethrough, an externally-threaded inlet 14 adapted to be connected to a cylinder for liquefied gas, and an internally-threaded outlet 16 adapted to be communicated to a point of use. The valve body may be made of any suitable material dependent largely upon the fluid with which the valve will be used. The inlet and outlet are preferably formed at right angles to one another.

The passageway 12 within the valve body 11 is defined in part by a venturi passage 17, which terminates in a valve seat 18.

Formed on the body 11 is a boss 19 for receiving a spring-actuated relief valve 20, which is adapted to close the end of a valve seat defined by the annular flange or rim 21 in the valve body. The spring 22 for biasing the valve 20 against the valve seat 21 operates between the washer 23 which is backed against the valve 20 and the end cap 24 which encloses the end of the boss 19. The washer 23 and valve disc 20 are supported in a guide 25. The structure of the relief valve is of conventional design and does not form part of this invention.

The flow of fluid through the passageway 12 is regulated by a valve disc carried on the disc holder and diaphragm subassembly 26. At its upper end, the subassembly 26 is operatively affixed to the valve stem 28. A handle or handwheel 30 is connected to the upper end of the valve stem 28 to rotate the valve stem. Upon rotation of the valve stem 28, the disc holder and diaphragm assembly is reciprocated toward and away from operative engagement with the valve seat 18.

The valve stem and the disc holder and diaphragm subassembly 26 are operatively retained within the opening 29 in the valve body 11 by means of a bonnet or nut member 32. The bonnet 32 is externally threaded along the lower portion thereof. The externally threaded portion of bonnet 32 is adapted to engage with the internal threads provided in the opening 29 in the valve body 11. A stem washer 34 is provided between the bonnet 32 and the valve stem 28.

Referring now to FIGURES 2 and 3, there is shown on an enlarged scale the disc holder and diaphragm subassembly 26. The subassembly 26 comprises a generally cylindrical disc holder 40 having a rim or head 39 at one end thereof, an enlarged upper portion 41 and a reduced elongated rod-like portion 42. An annular groove or recess 43 is foamed in the lower surface of the enlarged portion 41. An annular, generally cylindrical abutment shoulder 44 is defined between the lower surface of the enlarged portion 41 and the elongated rod-like portion 42 of the disc holder 40.

Disposed about the disc holder 40 is an annular washer-like diaphragm 46. The inner periphery of the diaphragm 46 is affixed to the subassembly 26 by means of the annular sleeve 48, which is carried concentrically on the elongated rod-like portion 42 of the disc holder 40. The top surface of the sleeve 48, which is opposed to the lower surface of the enlarged portion 41, is provided with an annular recess 49. As best seen in FIGURE 2, the recesses 43 and 49 are opposed and the inner edge of the diaphragm 46 is compressed between the opposed surfaces of the disc holder and the annular sleeve so as to compress the resilient diaphragm into the grooves or recesses 43 and 49. The transverse or radially extending surface of annular abutment shoulder 44 engages sleeve 48 for properly spacing the enlarged portion 41 of disc holder 40 from the sleeve 48 so as to prevent excessive compression of the diaphragm 46.

The valve disc 50, which is adapted to engage the valve seat 18 to close the flow of fluid through passageway 12, is retained in a recess or groove 53 formed in part by the surface 52 on the sleeve 48 and in part by the surface 54 on the washer 56.

The subassembly 26 is retained in operative connected relationship by means of crimping or staking the end of the elongated member 42 as indicated generally at 58 (FIGURE 2).

Valve disc 50 and valve member 20 may be made from a suitable plastic material, such as a fluorocarbon, known as Teflon or Kel-F, or a polycarbonate known as Lexan. The diaphragm 46 is preferably made from an elastomer material such as Buna N.

Referring to FIGURE 4, it is seen that the bottom of the valve stem 28 is provided with an elongated undercut groove 60 which extends to the end or circumference of the valve stem 28. The slot or groove 60 is adapted to receive the head 39 on the disc holder 40. It will be apparent that in response to rotation of valve stem 28, the subassembly 26 will be reciprocated toward and away from sealing engagement with valve seat 18.

A novel feature of the present invention is the ease with which the subassembly 26 may be fabricated. There is no threaded interconnection of components and after assembly of the diaphragm 46, the sleeve 48, the valve disc 54, and the washer 56 upon the disc holder, the components are staked in place as indicated at 58, to form a permanent union of elements.

As seen from FIGURE 4, the disc holder and diaphragm subassembly 26 is readily connected to the valve stem 28 by engaging the head 39 of subassembly 26 within the undercut slot 60 formed in the bottom of valve stem 28. These units are properly positioned within the opening 29 in the valve body. Ring member 31 is inserted into opening 29 and bonnet 32 is then affixed to the valve stem and threadedly engaged in the opening 29. The ring member 31 is engaged by bonnet 32 and forced downwardly to engage the diaphragm 46 and compress the outer periphery of the diaphragm between member 31 and the shoulder 35 formed in the valve body. By use of ring member 31, there is no relative motion between the bonnet 32 and diaphragm 46. To enhance retention of the diaphragm, an annular groove 33 is formed in the shoulder. The bonnet 32 is threaded into opening 29 to cause member 31 to displace a portion of the diaphragm into recess 33.

The handwheel 30 is then affixed to the valve stem 28. The handwheel is preferably of the type best shown and described in the copending application of Donald D. Hockett, Serial No. 414,640 now Pat. No. 3,285,641, filed Nov. 30, 1964.

In use, it will be apparent that upon rotation of the handle, the valve stem 28 will be rotated within bonnet 32 to move the disc holder and diaphragm subassembly 26 toward and away from the valve seat 18 to control the flow of fluid through passage 12. When the valve disc 50 is engaged with the valve seat, flow through passageway 12 is stopped.

The diaphragm 46 is fixedly engaged at its inner periphery between the disc holder 40 and the sleeve 48 and at its outer periphery between the lower surface 31 of the bonnet 32 and the shoulder 35 defined in the valve body. By compressing the ends of the annular diaphragm 46, the intermediate portion is bulged somewhat as indicated at 47. The diaphragm forms a positive seal to prevent leakage of fluid between the subassembly 26 and the wall of valve body 11 defining opening 29 during use.

The subassembly of the present invention is readily fabricated and in operation, the subassembly 26 cooperates with the valve body to provide a durable and long-lasting seal for preventing the escape of gas between the subassembly and the valve body. By virtue of reciprocating the valve disc on the subassembly into engagement with the valve seat, wear of the valve disc is minimized, with no loss in sealing efficiency.

While I have described a presently preferred embodiment of the invention, it will be understood that the invention is not limited thereto since it may be otherwise embodied within the scope of the following claims.

I claim:

1. In a valve mechanism, the combination of a valve body, means defining a fluid flow passage in said valve body, means defining a valve seat in said valve body, a disc holder and diaphragm subassembly in said valve body disposed in an opening in said valve body which communicates with said flow passage and said valve seat, said subassembly comprising a disc holder having an enlarged portion, a reduced abutment shoulder providing a radially disposed surface and a transverse surface and an elongated rod-like portion, an annular diaphragm carried on said disc holder, a sleeve member carried on said elongated rod-like portion and engaging said diaphragm, the inner periphery of said diaphragm engaging said abutment shoulder and being compressed between said enlarged portion on said disc holder and said sleeve member, said sleeve member abutting said radially disposed surface on said abutment shoulder to prevent excessive compression of said diaphragm, a washer on the end of said rod-like portion defining a recess in cooperation with said rod-like portion, a valve disc carried in said recess for selectively engaging said valve seat to control the flow of fluid through said flow passage, the end of said rod-like portion being staked to secure the components of the subassembly together, bonnet means threadedly secured to said valve body for securing said subassembly in the opening in the valve body and for abutting and compressing the outer periphery of said diaphragm to seal said opening in said valve body, and handle means including a valve stem rotatively engaged with said bonnet means and operatively connected with said subassembly for reciprocating said subassembly and said valve disc carried thereon toward and away from the valve seat to regulate flow through said flow passage.

2. In a valve mechanism, the combination of a valve body, means defining a fluid flow passage in said valve body, means defining a valve seat in said valve body, a disc holder and diaphragm subassembly in said valve body disposed in an opening in said valve body which communicates with said flow passage and said valve seat, said subassembly comprising a disc holder having an enlarged portion, a reduced abutment shoulder, and an elongated rod-like portion, an annular diaphragm carried on said disc holder, a sleeve member carried on said elongated rod-like portion and engaging said diaphragm, the inner periphery of said diaphragm engaging said abutment shoulder and being compressed between said enlarged portion on said disc holder and said sleeve member, said sleeve member abutting said abutment shoulder to prevent excessive compression of said diaphragm, a washer on the end of said rod-like portion defining a recess in cooperation with said rod-like portion, a valve disc carried in said recess for selectively engaging said valve seat to control the flow of fluid through said flow passage, the end of said rod-like portion being staked to secure the components of the subassembly together, there being an annular shoulder in said body for receiving and engaging with said diaphragm, there being an annular groove in said annular shoulder, bonnet means threadedly secured to said valve body for securing said subassembly in the opening in the valve body and for abutting and compressing the outer periphery of said diaphragm against said annular shoulder and for displacing diaphragm material into said annular groove to seal said opening in said valve body.

References Cited

UNITED STATES PATENTS

| | | | |
|---|---|---|---|
| 1,662,291 | 3/1928 | Bastian | 251—357 X |
| 2,136,940 | 11/1938 | Ehbrecht | 251—357 X |
| 2,653,788 | 9/1953 | Svabek | 251—356 X |
| 2,891,763 | 6/1959 | Fortune | 251—357 X |
| 3,145,733 | 8/1964 | Shaw et al. | 251—357 X |
| 3,154,288 | 10/1964 | Tripoli | 251—335 X |
| 3,251,575 | 5/1966 | Campbell et al. | 251—335 X |

FOREIGN PATENTS 552,186  3/1943  Great Britain.

M. CARY NELSON, *Primary Examiner.*

S. SCOTT, *Assistant Examiner.*